(12) United States Patent
Kaminska et al.

(10) Patent No.: US 8,749,950 B2
(45) Date of Patent: Jun. 10, 2014

(54) IONIC POLYMER METAL COMPOSITE CAPACITOR

(75) Inventors: Bozena Kaminska, Vancouver (CA); Clinton K. Landrock, North Vancouver (CA)

(73) Assignee: Simon Fraser University, Burnaby (CA)

( * ) Notice: Subject to any disclaimer, the term of this patent is extended or adjusted under 35 U.S.C. 154(b) by 915 days.

(21) Appl. No.: 12/628,106

(22) Filed: Nov. 30, 2009

(65) Prior Publication Data

US 2010/0271755 A1    Oct. 28, 2010

Related U.S. Application Data

(63) Continuation-in-part of application No. 12/386,789, filed on Apr. 22, 2009, now Pat. No. 8,253,536.

(51) Int. Cl.
*H01G 4/08* (2006.01)
*H01G 9/00* (2006.01)
*B32B 27/00* (2006.01)

(52) U.S. Cl.
USPC ............................ 361/323; 361/502; 428/421

(58) Field of Classification Search
USPC .................................. 361/323, 502; 428/421
See application file for complete search history.

(56) References Cited

U.S. PATENT DOCUMENTS

| | | | |
|---|---|---|---|
| 3,419,760 A | | 12/1968 | Raleigh |
| 3,969,197 A * | | 7/1976 | Tolar et al. ................... 205/122 |
| 7,835,136 B2 * | | 11/2010 | Feaver et al. ................. 361/502 |
| 2002/0110732 A1 * | | 8/2002 | Coustier et al. ............... 429/144 |
| 2004/0025639 A1 | | 2/2004 | Shahinpoor et al. |
| 2007/0146971 A1 * | | 6/2007 | Dweik et al. .................. 361/532 |
| 2009/0308532 A1 * | | 12/2009 | Kinoshita et al. ............. 156/281 |

OTHER PUBLICATIONS

P. Staiti, M. Minutoli, F. Lufrano, "All Solid Electric Double Layer Capacitors Based on Nafion Ionomer", Electrochimica Acta, vol. 47.*

Yindar Chuo, Clint Landrock, Badr Omrane, Jeydmer Aristizabel, Jasbir N. Patel, Marcin Marzencki, & Bozena Kaminska, Towards Self-Powering Touch/Flex Sensitive OLED Systems, IEEE Sensors Journal (expanded paper from IEEE Sensors 2010 Conference), Jul. 23, 2011, http://ieeexplore.ieee.org/xpls/abs_all.jsp?arnumber=5928374&tag=-1.

(Continued)

*Primary Examiner* — Eric Thomas
*Assistant Examiner* — Arun Ramaswamy
(74) *Attorney, Agent, or Firm* — Dean Palmer IP Law/IProperty Inc.

(57) ABSTRACT

An ionic polymer metal composite (IPMC) capacitor is disclosed which includes a thin single layer non-hydrated ionic polymer substrate with conductive film electrodes applied to at least a portion of each side of the non-hydrated ionic polymer substrate. The disclosed capacitor is suited for providing thin capacitance structures made to substantially any desired dimensions and shape and may be particularly suited for short term power storage in low power electronics, sensors, micro-electronics, MEMs and high temperature applications. A method of manufacturing an IPMC capacitor is also disclosed including providing a thin single layer non-hydrated ionic polymer substrate, applying a conductive film electrode to both sides of the substrate, and attaching electrical connections to the electrodes. The disclosed method of manufacture may optionally also include heat curing the capacitor and coating the capacitor with at least one moisture-resistant protective coating layer.

20 Claims, 6 Drawing Sheets

(56) References Cited

OTHER PUBLICATIONS

Yindar Chug, Badr Omrane, Clint Landrock, Jeydmer Aristizabel, Donna Hohertz, Boris Niraula, Sasan V. Grayli, & Bozena Kaminska, Powering the Future: Integrated, Thin, Flexible Organic Solar Cells with Polymer Energy Storage, IEEE Design and Test of Computers. Jul. 20, 2011, http://www.computer.org/portal/web/csdl/doi/10.1109/MDT.2011.93.

Clinton K. Landrock & Bozena Kaminska, High Temperature Polymer Capacitors for Aerospace Applications, European Design and Automation Association (published in conference proceedings), Mar. 8, 2010, http://portal.acm.org/citation.cfm?id=1871250.

Clint Landrock, High Temperature Capable Ionic Polymer-Metal Composite Capacitors and Power Storage Systems, SAE International (published in conference proceedings), Nov. 2, 2010, http://papers.sae.org/2010-01-1727.

Shahinpoor, M. & Kwang, J.K., Ionic Polymer-Metal Composites: I. Fundamentals, Smart Materials and Structures, Aug. 7, 2001, pp. 819-833, vol. 10, Institute of Physics Publishing, London, UK.

J Brufau-Penella, M Puig-Vidal, P Giannone, S Graziani, S Strazzeri, Characterization of the harvesting capabilities of an ionic polymer metal composite device, Nov. 27, 2007, Smart Materials and Structures 17 (2008) 015009 (15pp), IOP Publishing Ltd.

Kwang J Kim, Mohsen Shahinpoor, Ionic polymer—metal composites: II. Manufacturing techniques, Smart Materials and Structures 12 (2003) 65-79, IOP Publishing Ltd.

Kwang J. Kim, Mohsen Shahinpoor, A novel method of manufacturing three-dimensional ionic polymer-metal composites (IPMCs) biomimetic sensors, actuators and artificial muscles, Polymer 43 (2002) 797-802, Elsevier Science Ltd.

Kyung-Won Park, Hyo-Jin Ahn, Yung-Eun Sung, All-solid-state supercapacitor using a Nafion® polymer membrane and its hybridization with a direct methanol fuel cell, Journal of Power Sources 109 (2002) 500-506,7 pages, Elsevier Science B.V.

Kenneth M. Newbury, Donald J. Leo, Electromechanical Modeling and Characterization of Ionic Polymer Benders, Journal of Intelligent Material Systems and Structures, vol. 13—Jan. 2002, SAGE Publications.

C Bonomo, L Fortuna, P Giannone, S Graziani and S Strazzeri, A model for ionic polymer metal composites as sensors, Smart Materials and Structures 15 (2006) 749-758, IOP Publishing.

\* cited by examiner

IONIC POLYMER METAL COMPOSITE CAPACITOR

1. RELATED APPLICATIONS

This application claims priority benefit to and is a continuation-in-part of previously filed non-provisional U.S. patent application Ser. No. 12/386,789 filed Apr. 22, 2009, the contents of which are herein incorporated by reference in their entirety.

2. TECHNICAL FIELD

The present invention relates generally to ionic polymer metal composite structures. More particularly, the present invention relates to an ionic polymer metal composite capacitor structure, where the capacitor comprises a thin strip or sheet which may be simply and inexpensively manufactured in a wide range of shapes and sizes as desired for particular applications.

3. BACKGROUND OF THE INVENTION

Conventional capacitors for power storage use in electronics and other electrical circuits are known, including various types of electrolytic and non-electrolytic capacitors adapted for a variety of applications, however, most existing capacitor designs typically result in relatively fixed shapes and dimensions such as discoid or cylindrical shapes, which limit their usefulness in certain size and/or shape limited spaces or applications, particularly where relatively large capacitive storage capacities are required. Additionally, most existing capacitor designs are limited in scalability, which may result in non-linear relationships between size and capacitance ratings, which may be undesirable particularly for applications requiring very small capacitor sizes, and/or large capacitances.

Many existing capacitor designs are also limited in the range of temperatures in which they may be used, and may not be suitable for high temperature use above about 100° C. to 200° C. Common electrolytic type capacitors are also typically limited by their sensitivity to the polarity of their electrical connection. Some more advanced capacitor designs such as super or ultra-capacitors also require relatively complex and potentially expensive manufacturing techniques in order to provide increased capacitive performance such as high specific capacitance ratings.

Ionic polymer metal composite structures have been developed for applications in the fields of actuators, sensors and smart materials, for example, and in some electrochemical ultra-capacitor designs. Existing ionic polymer metal composite (IPMC) structures typically rely on a hydrated ionic polymer material hydrated with an ionic fluid, to allow migration of ions and corresponding concentration of water molecule density across the ionic polymer in response to the application of a potential difference, resulting in the desired mechanical deformation or actuation of the IPMC structure.

In many hydrated IPMC structures, the requirement to maintain hydration of the ionic polymer material with an ionic fluid, and to impregnate typically precious metal (such as platinum) electrodes into the structure of the ionic polymer material has resulted in typically complex manufacturing processes, leading to increased production cost and variability in mechanical and electrical properties of the resulting hydrated IPMC structures.

Accordingly, there is a need for a capacitor which may be simply and inexpensively manufactured and adapted to a wide variety of shapes and sizes, while providing desirable specific capacitive storage capacities and extended operating temperature ranges.

4. SUMMARY OF THE INVENTION

It is an object of the present invention to provide an ionic polymer metal composite capacitor that addresses some of the limitations of the prior art.

Another object of the present invention is to provide a method for manufacturing a thin ionic polymer metal composite capacitor that addresses some of the limitations of the prior art.

It is a further object of the invention to provide an ionic polymer metal composite capacitor that addresses some of the limitations of the prior art and that can be manufactured in a wide range of sizes, shapes and configurations, including an ionic polymer metal composite capacitor that can be formed to take the shape of a device into which it is integrated as a component.

According to an embodiment of the present invention, an ionic polymer metal composite capacitor is provided, comprising a thin single layer non-hydrated ionic polymer substrate comprising first and second substantially parallel major surfaces and first and second conductive film electrodes applied to at least a portion of the first and second surfaces, respectively, of the thin single layer non-hydrated ionic polymer substrate, wherein each of the conductive film electrodes comprises at least one electrically conductive material.

According to another embodiment of the invention, the ionic polymer metal composite capacitor may additionally comprise first and second electrical connections conductively attached to the first and second conductive film electrodes, respectively. According to a further embodiment, the ionic polymer metal composite capacitor may also further comprise a first dielectric layer situated between the first surface of the ionic polymer substrate and the first conductive film electrode, and a second dielectric layer situated between the second surface of the ionic polymer substrate and the second conductive film electrode. According to yet a further embodiment, the ionic polymer metal composite capacitor may further comprise one or more nano-arrays each comprising a pattern of nanofeatures formed in at least one of the conductive film electrodes, and/or at least one protective coating layer applied to at least one of the conductive film electrodes.

According to yet another embodiment of the invention, a method of manufacturing an ionic polymer metal composite capacitor is provided, the method comprising: providing a thin single layer non-hydrated ionic polymer substrate comprising first and second substantially parallel major surfaces; applying first and second conductive film electrodes to at least a portion of the first and second surfaces, respectively, the conductive film electrodes comprising at least one electrically conductive material; and attaching at least one electrical connection to each of the first and second conductive film electrodes. In one embodiment, the method may additionally comprise: curing the ionic polymer metal composite capacitor at a temperature of at least 100° C. so as to remove at least a portion of any moisture in the non-hydrated ionic polymer substrate; and coating at least a portion of the ionic polymer metal composite capacitor including at least a portion of the conductive film electrodes with a protective coating material to provide at least one protective coating layer.

Further advantages of the invention will become apparent when considering the drawings in conjunction with the detailed description.

5. BRIEF DESCRIPTION OF THE DRAWINGS

The ionic polymer metal composite capacitor of the present invention will now be described with reference to the accompanying drawing figures, in which.

Similar reference numerals refer to corresponding parts throughout the several views of the drawings.

6. DETAILED DESCRIPTION OF THE INVENTION

The present invention provides for exemplary ionic polymer metal composite (IPMC) capacitors which may be easily manufactured using proven equipment and techniques, and which may desirably provide scalable capacitive electrical charge storage capacity in a thin film ionic polymer metal composite structure which may be produced in a variety of shapes, sizes and configurations. The present invention additionally provides for a method of manufacturing such exemplary IPMC capacitors. Ionic polymer metal composite capacitors according to embodiments of the present invention may advantageously be used in a very wide range of applications where capacitive power storage is required. Examples of applications of IPMC capacitors according to embodiments of the present invention may include, without limitation:

Short term power storage capacity for low power electronics such as light emitting diodes (LEDs), organic light emitting diodes (OLEDs), small displays or screens such as on watches, cellular telephones, digital music players, digital imaging systems and other electronic devices, radio frequency identification (RFID) systems, radio frequency (RF) sensors, microsensors, and microelectromechanical (MEMs) systems;

Durable power storage capacity and/or sensing capacity for wearable or micro-electronic systems, including for use in wearable power generation systems integrating power generation and/or storage capacity within flexible fabric or other textile materials;

Sensors and sensing systems, such as for providing capacitive coupling capacity for pressure and other sensors including for use in extreme environments requiring high accuracy and precision of sensors; and Capacitive power storage components for electronic circuits and devices for use in extreme environments under extreme conditions of temperature, pressure and/or force, such as for example in aerospace and/or automotive applications.

In particular, the IPMC capacitors according to embodiments of the present invention may be applied in applications where a thin, flexible, and/or high temperature power storage device which may be configured to substantially any desired shape may be needed.

Figure 1:
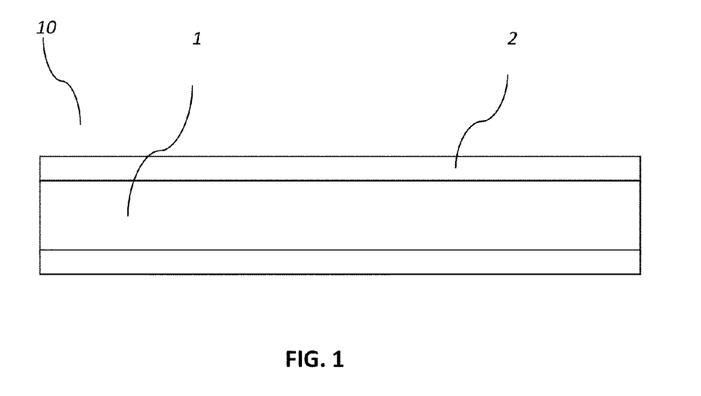
FIG. 1 illustrates a cross-sectional view of an exemplary ionic polymer metal composite capacitor according to an embodiment of the present invention.

The present invention will now be further described with reference to the Figures. FIG. 1 illustrates a cross-sectional view of an exemplary ionic polymer metal composite (IPMC) capacitor 10 according to an embodiment of the present invention. The IPMC capacitor 10 is preferably provided in the form of a thin flexible sheet, and may preferably be manufactured or cut to any desired dimensions as may be required for an intended application, such as one or more of the applications described above, for example. The IPMC capacitor 10 comprises a thin single layer of non-hydrated ionic polymer substrate 1, forming the backbone or core of the IPMC capacitor, and conductive film electrodes 2 applied to at least a portion of first and second opposing substantially parallel major surfaces (or sides) of the thin single layer non-hydrated ionic polymer 1 substrate, such as both substantially planar sides of a film or sheet of said non-hydrated ionic polymer material.

The non-hydrated ionic polymer substrate 1 may be formed of any one of several suitable known non-hydrated or dry ionic polymer materials which can be provided as a thin sheet or film, such as non-hydrated fluoropolymer based ionic polymer materials, or polyethylene or polyamide based ionic polymer materials, for example. In particular, a non-hydrated perfluorosulfonic acid (PFSA)/polytetrafluoroethylene (PTFE) copolymer may be used to form non-hydrated ionic polymer substrate 1. One suitable such exemplary PFSA/PTFE non-hydrated ionic polymer is Nafion™ N-115 ionic polymer, for example, which is commercially available from the E.I. DuPont et Nemours Company. Such N-115 non-hydrated ionic polymer is typically commercially available as a film substrate with a thickness of about 127 μm and may be used for non-hydrated ionic polymer substrate 1, according to an embodiment of the invention. Similar Nafion™ non-hydrated ionic polymer films are commercially available in thicknesses from about 80 μm to about 250 μm, such as Nafion™ N-117, for example with a thickness of about 183 μm. Alternatively, a suitable non-hydrated ionic polymer material may be produced in a thin film form suitable to use as substrate 1 such as by spin-coating or otherwise depositing a suitable liquid ionic polymer material and allowing it to dry/cure to form a non-hydrated ionic polymer film, for use as substrate 1. In one such embodiment, a thin non-hydrated ionic polymer film for use as substrate 1 may be formed by spin-coating a suitable liquid ionic polymer material onto a glass surface such as at 1500 to 1800 RPM, for example.

In a particular embodiment of the present IPMC capacitor, the non-hydrated ionic polymer substrate 1 may preferably comprise a thin sheet or film less than about 400 μm thick, and more preferably between about 100 μm to 200 μm thick. However, in other embodiments, the non-hydrated ionic polymer substrate 1 may comprise any suitable thickness such as from about 10 μm to 75 μm for very thin capacitors, or alternatively, of greater than 400 μm, for example, while preferably still providing for desired characteristics such as a thin, sheet-like morphology, and flexibility, for example.

Conductive film electrodes 2 may be made from any suitably electrically conductive material which may be formed as a thin conductive film. Exemplary such electrically conductive materials may comprise metallic materials such as gold, silver, platinum, copper, carbon (such as graphitic, polycrystalline or nanocrystalline carbon), aluminum, other known electrically conductive metallic materials, and alloys thereof, and/or conductive polymer materials such as indium tin oxide, polypyrrole (PPy), or other conductive polymers, for example. In one embodiment, the conductive film electrodes 2 may each comprise a layer of a suitable electrically conductive material applied to the at least a portion of the surface of non-hydrated ionic polymer substrate 1 in a film or layer of approximately 50 nm to 500 nm thickness, for example. In a particular embodiment, conductive film electrodes 2 may comprise a film of gold (Au) of approximately 75 nm to 150 nm thickness, applied to at least a portion of the surface of non-hydrated ionic polymer substrate 1. In a further embodiment, conductive film electrodes 2 may comprise a film of gold and/or chromium of approximately 100 nm to 125 nm thickness applied to the surface of non-hydrated ionic polymer substrate 1. In yet a further embodiment, conductive film electrodes 2 may comprise a film or layer of a suitable electrically conductive material of any suitable desired thickness applied to at least a portion of the surface of non-hydrated ionic polymer substrate 1.

Conductive film electrodes 2 may be applied to the surface of non-hydrated ionic polymer substrate 1 by any suitable means or method so as to attach, adhere or otherwise suitably join the conductive film electrodes 2 to at least a portion of both major surfaces of the non-hydrated ionic polymer 1 to form the IPMC capacitor structure 10. In one embodiment, conductive film electrodes 2 may be formed and applied to the surface of non-hydrated ionic polymer substrate 1 by sputtering onto the substrate 1 from a source of one or more desired electrically conductive materials, such as in physical sputtering, electronic sputtering, potential sputtering, chemical sputtering, radio frequency (RF) sputtering, DC sputtering, or other known sputtering techniques. In a particular embodiment, the conductive film electrodes 2 may be formed and applied to the surface of the non-hydrated ionic polymer substrate 1 by RF sputtering, such as by using a corona-type RF sputtering machine to apply a conductive film of gold of approximately 100 nm thickness to each side of substrate 1. In another embodiment, RF sputtering may be used to apply two or more conductive materials to the surface of non-hydrated ionic polymer substrate 1 to form conductive film electrodes 2, such as to apply a combination of gold and chromium for example, to form a conductive film electrode 2. In an alternative embodiment, conductive film electrodes 2 may be independently formed and then attached to the non-hydrated ionic polymer substrate 1 such as by adhesion, for example, to form IMPC capacitor 10.

In a further embodiment, one or more suitable conductive materials may be applied to at least a portion of the surface of the non-hydrated ionic polymer substrate 1 to form conductive film electrodes 2 by chemical deposition, vapor deposition, electrochemical deposition such as electroplating, or a combination thereof. In some embodiments of the invention, one or more of the surfaces of the non-hydrated ionic polymer substrate 1 may be prepared prior to the deposition or application of the conductive film electrodes 2, such as to improve the adhesion, attachment, and/or interface between the conductive film electrodes 2 and the substrate 1. In one such embodiment, at least a portion of the surface of non-hydrated ionic polymer substrate 1 may be roughened prior to the application of conductive film electrodes 2, such as by physical surface roughening using abrasive or other suitable roughening means, such as emery cloth or other physical abrasion media, for example. In other embodiments, at least a portion of one or more surfaces of non-hydrated ionic polymer substrate 1 may be roughened prior to application of conductive film electrodes 2 by alternative means, such as chemical, ion or plasma abrasion, bombardment or ablation methods, for example.

In one embodiment of the present invention, conductive film electrodes 2, such as approximately 100 nm thick gold electrodes 2 for example, may be applied to at least a portion of both sides of a single thin sheet or film of non-hydrated ionic polymer substrate 1, such as by RF sputtering to form a single-layer non-hydrated ionic polymer metal composite capacitor structure according to the invention. The single sheet of IPMC capacitor 10 may thereafter be cut into multiple individual strips and/or pieces of any suitable desired dimensions so as to provide customized individual IPMC capacitor components. Due to the substantially uniform structure and distribution of the non-hydrated ionic polymer substrate 1 and conductive film electrodes 2 of the IPMC capacitor structure 10, the specific capacitance of capacitor 10 has been found to desirably vary substantially linearly with the surface area of the IPMC capacitor 10, for a given specification of substrate 1 and electrodes 2. Therefore, such individual customized IPMC capacitors 10 may be cut from a larger IPMC capacitor structure manufactured as a single sheet, to form individual customized IPMC capacitors 10 having desired custom dimensions and corresponding custom capacitive charge storage capacity, as may be desired for a particular application. In one embodiment, the single-layer non-hydrated ionic polymer metal composite capacitor structure 10 may be cut to any desired size by using a knife or other edged cutting means, cutting beam means such as a laser and/or ion beam for example, or any other suitable cutting means to separate a single IPMC capacitor 10 into one or more smaller IPMC capacitors, as desired for a particular application.

According to another optional embodiment of the invention, a multi-cell IPMC capacitor may be provided comprising two or more individual electrode-substrate-electrode IPMC capacitive cells electrically connected to each other, for example. In one such embodiment, two or more single layer IPMC capacitors such as those described above may be stacked substantially on top of each other with an electrically insulating layer situated therebetween where each single layer IPMC capacitor is electrically connected in parallel to the other capacitors in the stack, such as to provide a multi-cell IPMC capacitor of combined capacitive storage capacity, for example. In another such embodiment, multiple single-layer IPMC capacitors may be connected laterally next to each other and connected in parallel to provide a thin multi-cell capacitor, for example. In further such embodiments, multiple single layer IPMC capacitors may be physically combined and electrically interconnected in parallel and/or series connection to provide multi-cell IPMC capacitors, as may be desirable for applications requiring increased capacitive storage capacity and/or redundancy of capacitive storage, for example.

Figure 2:
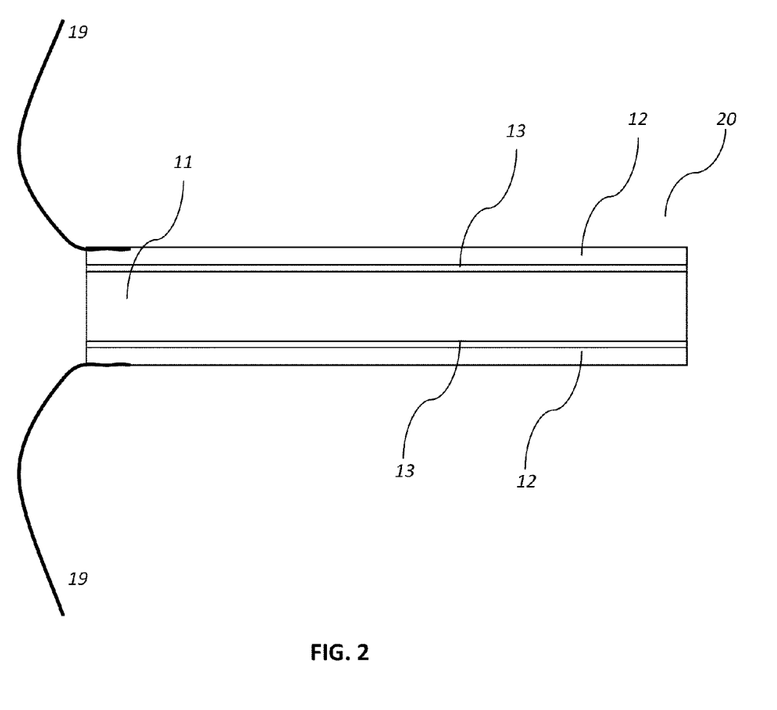
FIG. 2 illustrates a cross sectional view of an exemplary ionic polymer metal composite capacitor according to another embodiment of the invention.

Referring now to FIG. 2, a cross sectional view of an exemplary ionic polymer metal composite capacitor 20 according to another embodiment of the invention is shown. Similar to as described above in reference to FIG. 1, the IPMC capacitor 20 comprises a thin single layer non-hydrated ionic polymer substrate 11, forming the backbone or core of the IPMC capacitor, and conductive film electrodes 12 applied to at least a portion of both sides of the single layer non-hydrated ionic polymer 1 substrate. IPMC capacitor 20 further comprises a secondary conductive film electrode layer 13 between the non-hydrated ionic polymer substrate 11 and primary conductive film electrode 12, which is applied to the substrate 1 before the application of electrode layer 12. Additionally, IPMC capacitor 20 also comprises electrical connections or leads 19 attached to primary conductive film electrodes 12.

In one embodiment, conductive film electrode layer 13 may be used to improve the adhesion or attachment of primary conductive film electrode layer 12 to the non-hydrated ionic polymer substrate 1 of the IPMC capacitor. In another embodiment, secondary conductive electrode layer 12 may be used to provide other desired characteristics such as to improve physical, conductive, capacitive and/or other desired properties of IPMC capacitor 20. In a further embodiment, the conductive film electrodes may comprise two or more layers of conductive material applied sequentially to at least a portion of the non-hydrated ionic polymer substrate 11, wherein each layer may comprise the same conductive material or individual layers may comprise different conductive materials. In yet a further embodiment, two or more layers of conductive material may be deposited or laid down separately and may thereafter be applied to the substrate 11 to form conductive film electrode layers such as layers 12 and 13 of IPMC 20, for example.

In a particular embodiment, non-hydrated ionic polymer substrate 1 may comprise a Nafion N-115 material of approximately 127 µm thickness, the secondary conductive film electrode layer 13 may comprise a chromium film of approximately 5 nm thickness applied to the surface of substrate 1, and primary conductive film electrode layer 12 may comprise a gold film of approximately 100 nm thickness applied to the chromium film 13. In such an embodiment, chromium film 13 may be applied to the non-hydrated ionic polymer substrate 1 by corona RF sputtering, and gold electrode film 12 may also be applied to chromium film 13 by RF sputtering, to form IPMC capacitor 20. In alternative embodiments, other suitable conductive materials may be used to form the conductive film electrode layers, and may be applied to substrate 1 by any suitable method of application or deposition, such as those described above in reference to FIG. 1. In another embodiment, at least a portion of at least one of the surfaces of non-hydrated ionic polymer substrate 1 may be prepared prior to the application of a chromium secondary conductive film electrode layer 13 to improve adhesion to the substrate 1, such as by physically roughening the surface of substrate 1 using an abrasive medium such as emery paper, for example.

In one embodiment, electrical connections or leads 19 may comprise wires or other suitable means for providing an electrical connection to the primary conductive film electrodes 12 of IPMC capacitor 20. In a particular embodiment, electrical connections 19 may comprise common electrical wires comprising at least one electrical conductor, such as a copper, nickel, aluminum or other suitable conductor element for providing electrical connection. In such an embodiment, electrical connections 19 may desirably be used to connect a source and/or sink of electrical current to IPMC capacitor 20, such as to allow for connection of IPMC capacitor 20 within an electrical circuit, and to charge and/or discharge capacitor 20. In one embodiment, electrical connections 19 may be attached to conductive film electrodes 12 by any suitable attachment means, such as an adhesive, solder, bonding agent, and chemical and/or physical weld, for example. In a particular embodiment where conductive film electrode 12 comprises a thin sputtered metallic film, electrical connections 19 may be attached to electrode 12 by using an electrically conductive adhesive such as silvery epoxy, for example, in order to provide for secure attachment and electrical connection between electrode 12 and electrical connector 19.

Figure 3:
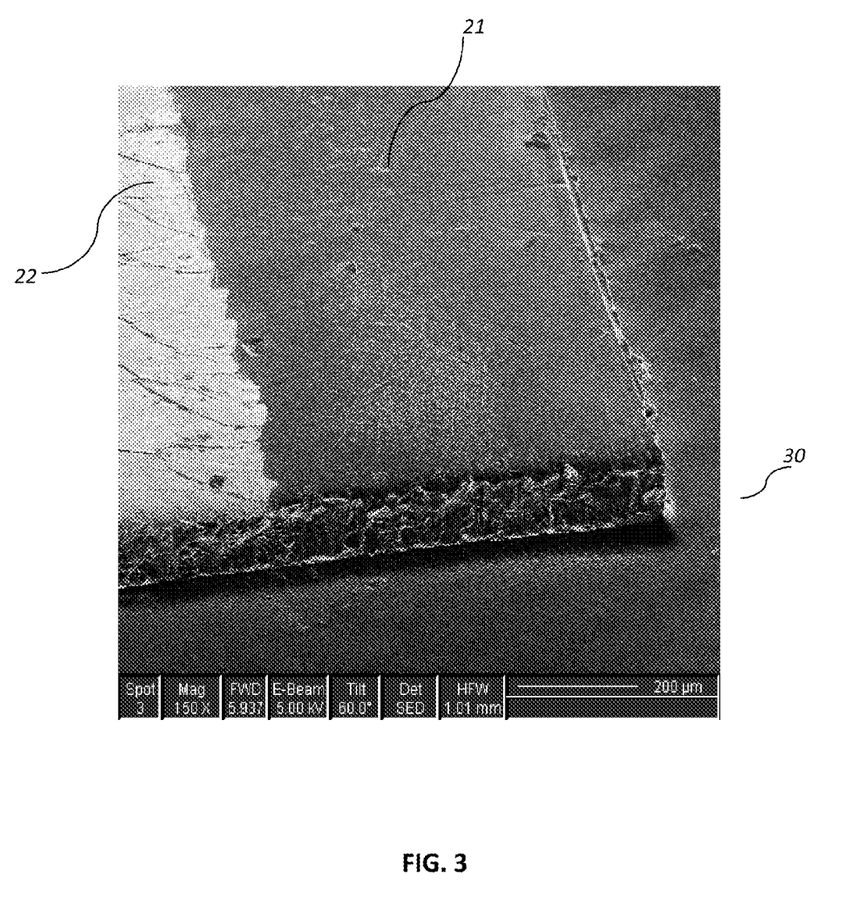
FIG. 3 illustrates a perspective view scanning electron microscope (SEM) micrograph of an ionic polymer metal composite capacitor according to an embodiment of the invention.

Referring to FIG. 3, a perspective view scanning electron microscope (SEM) micrograph of an ionic polymer metal composite capacitor 30 according to an embodiment of the invention is shown. In the embodiment shown in FIG. 3, the IPMC capacitor 30 comprises a thin single layer non-hydrated ionic polymer substrate 21 which comprises a non-hydrated Nafion™ N-115 PFSA/PTFE copolymer with a nominal thickness of 127 µm. The surfaces of the N-115 non-hydrated ionic polymer substrate 21 were then prepared by slightly roughening the surfaces with manual application of emery cloth. Following the surface preparation step, the conductive film electrodes 22 were applied to both sides of the non-hydrated ionic polymer substrate 21 by means of corona RF sputtering. In the embodiment shown in FIG. 3, the conductive film electrodes 22 comprise a first layer of chromium metal approximately 5 nm thick, which was sputtered directly onto the roughened surface of the substrate 1, followed by a second layer of gold metal approximately 100 nm thick, which was sputtered on top of the chromium layer to form the completed conductive film electrode 22.

In the embodiment shown in FIG. 3, the non-hydrated ionic polymer substrate 21 was cut from a larger sheet of Nafion™ N-115 material using a knife edge, to prepare a nominal substrate 21 of approximately 2 cm×5 cm for application of conductive film electrodes 22. Following application of the chromium and gold conductive film electrodes 22 by corona RF sputtering to form IPMC capacitor 30, wire electrical leads were attached to conductive film electrodes 22 by means of conductive silvery epoxy adhesive, to allow connection of IPMC capacitor 30 to an electrical circuit for capacitive testing. Testing of IPMC capacitor 30 by connection to a power supply and voltmeter showed that under an input current of 0.5 mA, IPMC capacitor 30 charged rapidly within seconds to approximately 1.2 V. Under discharge testing following charging for 60 seconds, IPMC capacitor 30 was found to discharge relatively rapidly to approximately 0.5 V in about 4-6 minutes, before voltage levels stabilized and maintained between approximately 0.3 V to 0.5 V until the discharge test was discontinued after 200 minutes. Accordingly, the exemplary IPMC capacitor 30 shown in FIG. 3 and described above according to an embodiment of the invention was found to show desirable capacitive behavior and performance, including relatively rapid charging behavior. Additionally, IPMC capacitors according to embodiments of the present invention, including the embodiment illustrated in FIG. 3, do not exhibit a sensitivity to polarity of charge, and may be charged and discharged without regard to polarity, unlike many other types of polarity sensitive capacitors, such as common electrolytic capacitors, for example.

Figure 4:
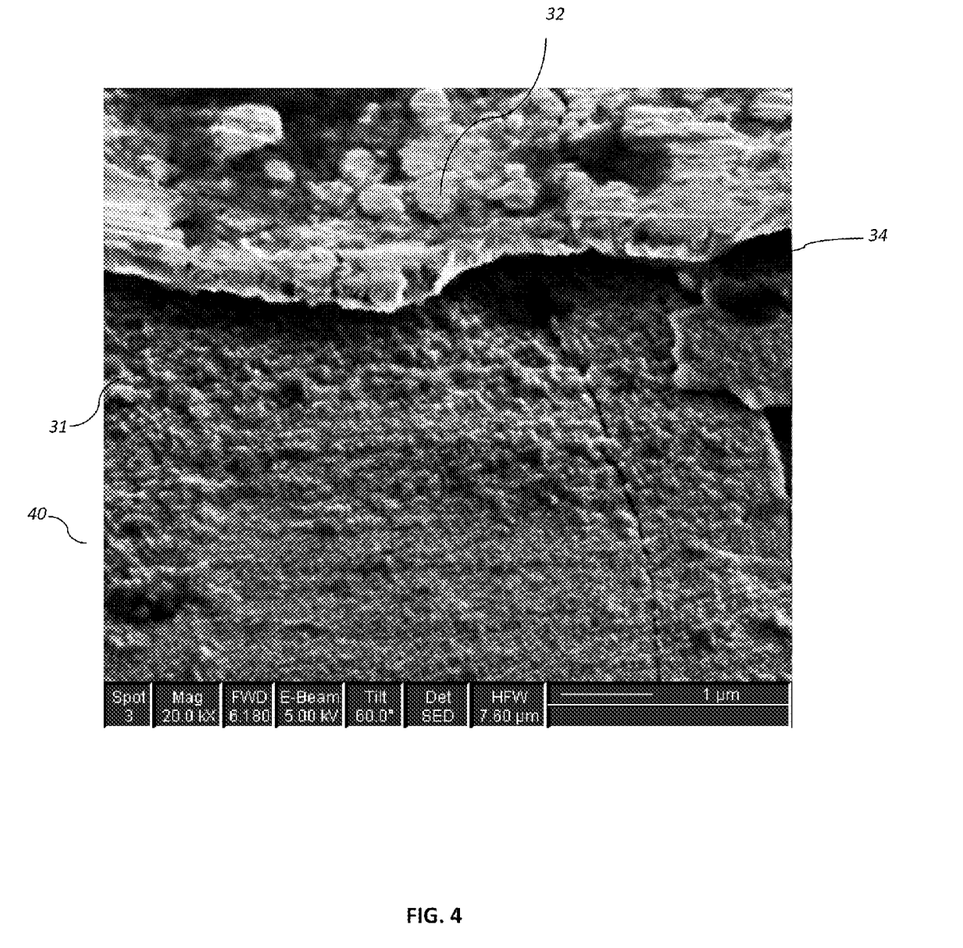
FIG. 4 illustrates a perspective view scanning electron microscope (SEM) micrograph of an edge of an ionic polymer metal composite capacitor according to an embodiment of the invention.

Referring to FIG. 4, a perspective view scanning electron microscope (SEM) micrograph of an edge of an ionic polymer metal composite capacitor 40 according to an embodiment of the invention is shown. Similar to the embodiment described above in reference to FIG. 3, in the embodiment shown in FIG. 4, the IPMC capacitor 40 comprises a single layer non-hydrated ionic polymer substrate 31 which comprises a non-hydrated Nafion™ N-115 PFSA/PTFE copolymer with a nominal thickness of 127 µm. The surfaces of the N-115 non-hydrated ionic polymer substrate 31 were slightly roughened with emery cloth prior to application of conductive film electrodes 32 to both sides of the non-hydrated ionic polymer substrate 31 by means of corona RF sputtering. In the embodiment shown in FIG. 4, the IPMC capacitor 40 also comprises a thin electric double layer or 34 between the non-hydrated ionic polymer substrate 31 and the conductive film electrode 32. Such dielectric layer or gap 34 separates the non-hydrated ionic polymer substrate 31 and conductive film electrode 32 on both sides of IPMC capacitor 40 (only one side shown in FIG. 4).

In one embodiment, the dielectric layer 34 between ionic polymer substrate 31 and electrode 32 may be between about 5 nm to about 50 nm thick. In the particular embodiment of the invention shown in FIG. 4, the dielectric layer 34 is approximately 5-10 nm thick. In some embodiments, the thickness of a dielectric layer 34 in IPMC capacitor 40 may be determined by the surface characteristics of the non-hydrated ionic polymer substrate 31 prior to the application of the conductive film electrodes 32. In particular, the relative smoothness or roughness of the surface of the non-hydrated ionic polymer substrate 31 onto which the conductive film electrodes 32 are applied may act to vary the existence and/or thickness of a dielectric layer 34 between substrate 31 and electrode 32—namely, a smoother surface of substrate 31 may result in a thinner or dielectric layer 34 or even the absence thereof, and a relatively rougher surface of substrate 31 may result in a thicker dielectric layer or gap 34. In another embodiment, the application or deposition technique used to apply conductive film electrodes 32 to the non-hydrated ionic polymer substrate 31 may also be varied to affect the relative thickness of the dielectric layer or 34 between the substrate 31 and electrode 32. In some embodiments, the dielectric layer or gap 34 may desirably function to provide a dielectric double layer within the structure of IPMC capacitor 40

The exemplary IPMC capacitor 40 shown in FIG. 4 was fabricated as described above, and following fabrication was cut using a knife edge into several individual IPMC capacitors of varying dimensions, including specimen IPMC capacitors having surface areas of approximately 1 $cm^2$, 2 $cm^2$, and 5 $cm^2$. Similar to as described above in reference to the embodiment shown in FIG. 3, wire electrical leads were attached to the conductive film electrodes 32 of the resulting IPMC capacitor specimens, by means of conductive silvery epoxy adhesive, to allow electrical connection for capacitive testing. The IPMC capacitor specimens were then tested for capacitive storage capacity, which was used to calculate specific capacitance values for the IPMC capacitor specimens of 1 $cm^2$, 2 $cm^2$, and 5 $cm^2$ surface area. It was determined that the capacitive storage capacity of the IPMC capacitor specimens varied substantially linearly in relation to the surface area of the specimen, and the different sized and shaped specimens demonstrated an essentially constant relative capacitance of approximately 0.98 $mF/cm^2$. Further, considering the specific mass of the non-hydrated ionic polymer, chromium and gold materials used to form the exemplary IPMC capacitor shown in FIG. 4, mass-specific capacitances of approximately 40 mF/g to 300 mF/g may typically be observed.

Accordingly, the IPMC capacitors according to and embodiment of the present invention may desirably be fabricated or manufactured in any desired standard shape and/or size, such as in relatively large standard sheets, and then may be cut to any desired shape and size, with the capacitance of the resulting custom cut IPMC capacitor depending only on the surface area of the capacitor, as may be desirable for many applications where the shape of an IPMC capacitor may be molded and/or cut to fit the geometry of the application in question.

Figure 5:
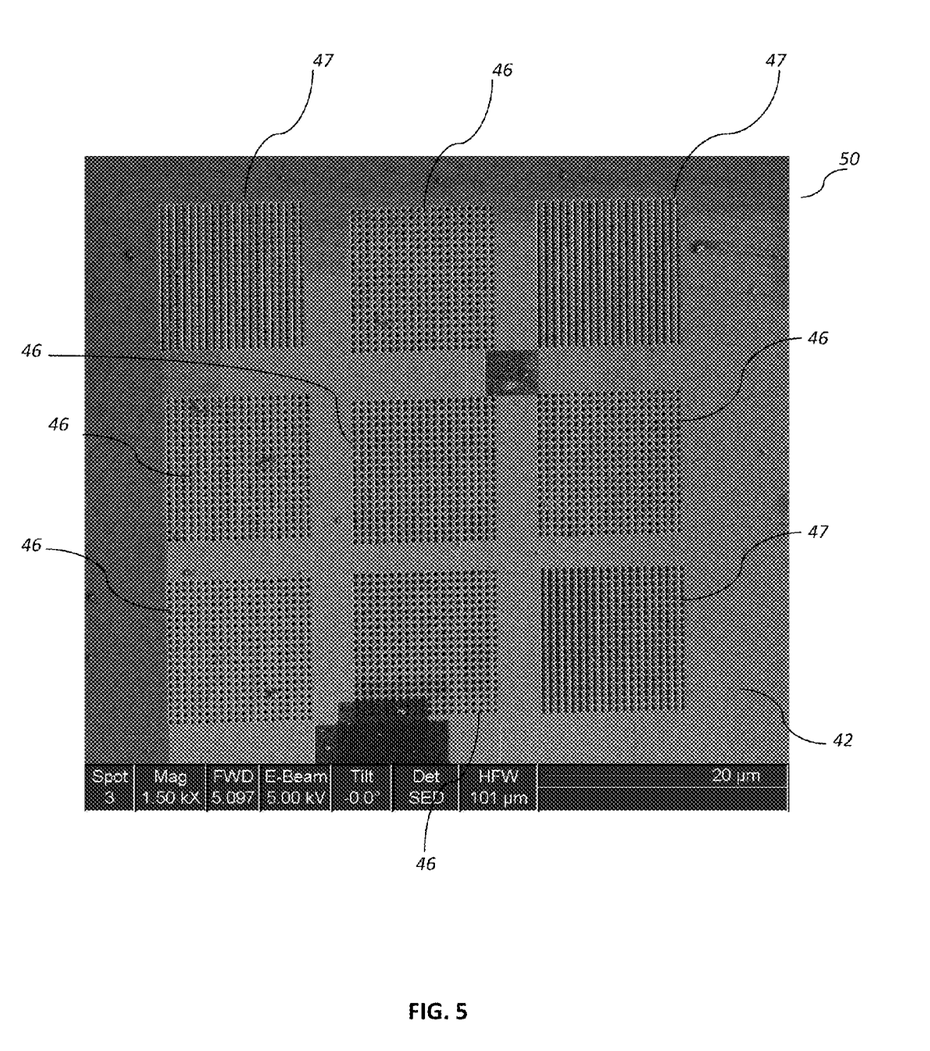
FIG. 5 illustrates a perspective view scanning electron microscope (SEM) micrograph of an ionic polymer metal composite capacitor incorporating nano-arrays according to a further embodiment of the invention.

Referring now to FIG. 5, a perspective view scanning electron microscope (SEM) micrograph of an ionic polymer metal composite capacitor 50 incorporating nano-arrays is shown, according to a further embodiment of the invention. In one embodiment, an IPMC capacitor 50 comprising a single layer non-hydrated ionic polymer substrate core (not shown in FIG. 5) and a conductive film electrode 42 applied to each side of the substrate may further comprise one or more nano-arrays formed on at least a portion of at least one of the conductive film electrodes 42. Such nano-arrays may desirably act to increase the capacitive storage capacity of the IPMC capacitor 50 by desirably providing additional nanoscale electrostatic charge storage elements on the surface of a conductive film electrode 42 of the IPMC capacitor 50. In a particular embodiment, one or more nano-arrays may be formed on at least a portion of conductive film electrode 42, where such nano-arrays may desirably comprise a pattern of nanoscale holes to form an exemplary nanohole array 46, or may comprise a pattern of nanoscale slits or slots to form an exemplary nanoslot array 47. In one embodiment, the nanoholes and/or nanoslots in each nano-array may be regularly and/or geometrically oriented, such as in a grid pattern, for example, as exemplified by nanohole arrays 46 and nanoslot arrays 47 shown in FIG. 4. In an alternative embodiment, nano-arrays may comprise random patterns of nanofeatures such as holes and/or slots, without any regular or geometric orientation.

In one embodiment, nano-arrays 46 and 47 may comprise individual nanohole and/or nanoslot features with dimensions in the range from approximately 50 nm to approximately 500 nm, for example. In a particular embodiment, nano-arrays 46 and 47 may comprise nanoholes approximately 200 nm in diameter, and/or nanoslots approximately 200 nm wide, for example. Such nano-arrays may be oriented on the conductive film electrode 42 in a substantially geometric arrangement, as shown in FIG. 5, or may alternatively be arranged substantially randomly on a portion of at least one of the electrodes 42 of IPMC capacitor 50.

In one embodiment of the present invention, nano-arrays 46 and 47 may comprise individual nanohole and/or nanoslot features formed in the conductive film electrode 42 by such means as nanoimprint lithography, or focused ion beam (FIB) milling such as gallium ion beam FIB milling using a focused gallium ion beam, for example. In a particular embodiment, a gallium FIB may be controlled to mill nanoholes, nanoslots and/or other nano-features such that the depth of penetration of the FIB is limited to the thickness of the conductive film electrode 42. Accordingly, such nano-features may be desirably contained within the conductive film electrode 42 and may not extend into the interface between the electrode 42 and the underlying non-hydrated ionic polymer substrate of the IPMC capacitor 50. In such an embodiment, nano-arrays may be formed by means of FIB milling of the conductive film electrode 42 following the application of the electrode 42 to the ionic polymer substrate of the IPMC capacitor 50.

In an alternative embodiment, nano-arrays may be formed in a layer of conductive film material deposited or formed separate from the non-hydrated ionic polymer substrate material, and such conductive film comprising the nano-arrays may thereafter be applied to the ionic polymer substrate to form conductive film electrode 42. In a further embodiment, nano-arrays may be formed in the conductive film electrode 42 by other known nano-fabrication techniques, such as nano-lithography and/or etching, and electron beam or e-beam milling, for example.

Figure 6:
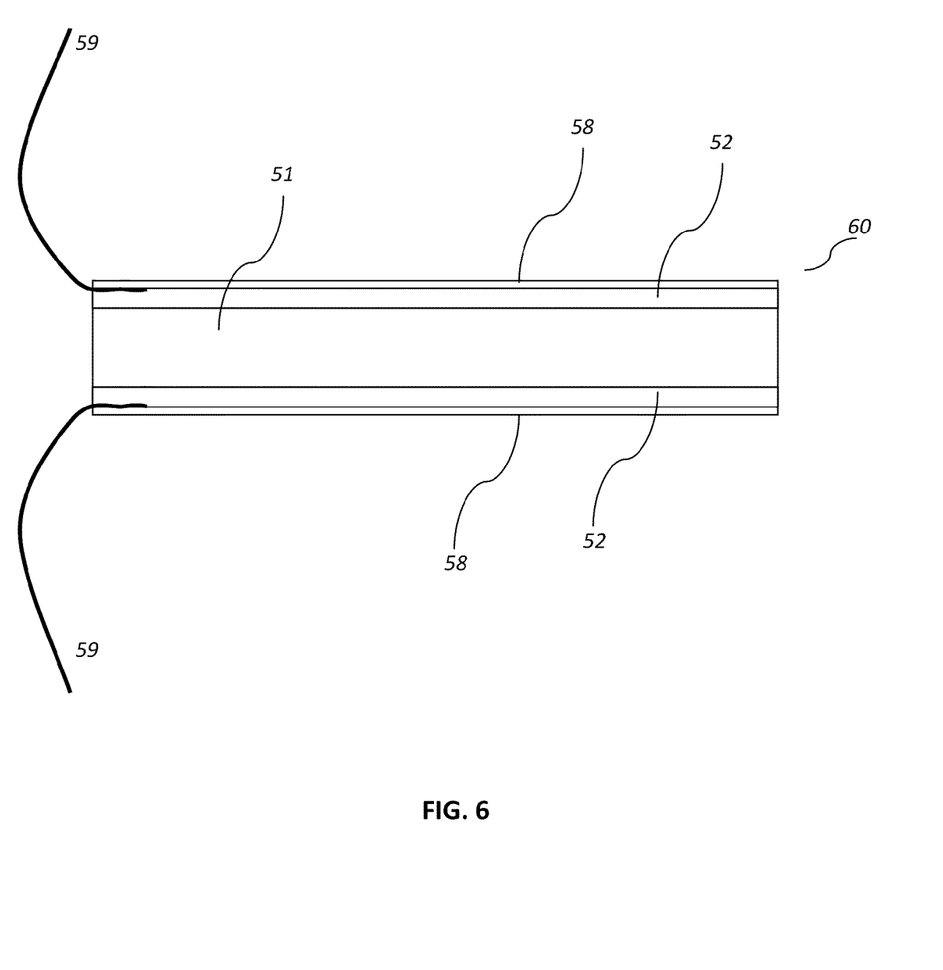
FIG. 6 illustrates a cross sectional view of an exemplary ionic polymer metal composite capacitor comprising a surface coating, according to another embodiment of the invention.

Referring to FIG. 6, a cross sectional view of an exemplary ionic polymer metal composite capacitor comprising a surface coating is shown, according to another embodiment of the invention. Similar to as described above in reference to FIGS. 1 and 2, the IPMC capacitor 60 comprises a single layer non-hydrated ionic polymer substrate 51, forming the core of the capacitor 60, and further comprises a conductive film electrode 52 applied to at least a portion of both sides of the ionic polymer substrate 51 such as by sputtering as described above, for example, to form the structure of the IPMC capacitor 60. IPMC capacitor 60 also comprises electrical connections or leads 59 attached to conductive film electrodes 52, such as by means of electrically conductive adhesive as described above, for example. IPMC capacitor 60 further comprises at least one protective coating layer 58 applied to at least a portion of the conductive film electrodes 52.

Figure 7:
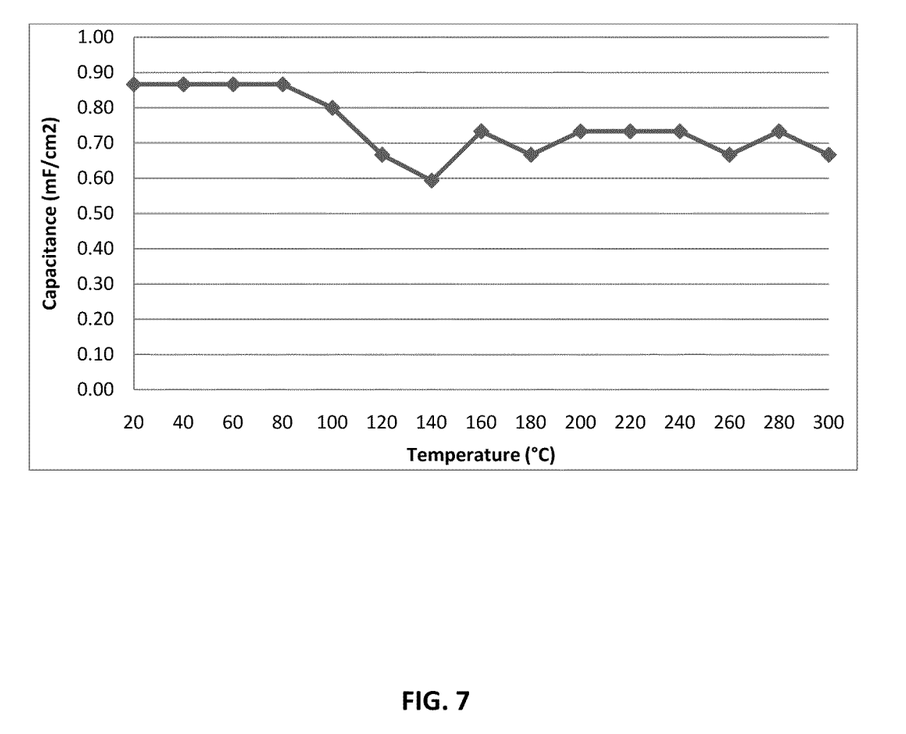
FIG. 7 illustrates a graph of specific capacitance vs. temperature for an exemplary ionic polymer metal composite capacitor according to an embodiment of the invention.

In one embodiment adapted for high temperature use such as at temperatures of up to about 300° C., the protective coating layer desirably provides moisture-resistant protection, and more desirably hermetic sealing protection to the IPMC capacitor 60 to reduce potential penetration or absorption of small amounts of moisture by the non-hydrated ionic polymer substrate 51. It has been found that potential moisture penetration and/or absorption by the ionic polymer 51 at temperatures below 100° C. has been found to negatively affect capacitive performance of IPMC capacitors subsequently operated at temperatures above about 100° C. In particular, it has been found that the specific capacitance of IPMC capacitors decreases as the operating temperature of the IPMC capacitor 60 approaches 100° C., due to the volatilization of small amounts of moisture which may be trapped and/or absorbed in the ionic polymer material 51. A graph of specific capacitance against operating temperature for an exemplary IPMC capacitor manufactured according to the present invention is shown in FIG. 7, and shows the above-mentioned decrease in specific capacitance due to moisture present in the ionic polymer material 51 of the capacitor 60, as temperature approaches and rises above 100° C., with the onset of the decrease visible at about 80° C.-85° C. Accordingly, it has been determined that reducing any amount of moisture penetration and/or absorption that occurs at temperatures below 100° C. may advantageously reduce the degree to which specific capacitance decreases as operating temperature rises above 100° C. for IPMC capacitors 60 in high temperature duty. Therefore, moisture-resistant coating layer 58 may be desirably applied to conductive film electrodes 52 of capacitor 60 to provide a barrier against penetration of moisture into the capacitor 60, and particularly into the non-hydrated ionic polymer material 51. In a particular embodiment, moisture-resistant coating layer 58 may be desirably applied over the entire outer surface of IPMC capacitor 60 including electrodes 52 and edges of ionic polymer material 51 to provide a moisture-resistant enclosure around capacitor 60. In a preferred embodiment, moisture resistant coating layer 58 may be applied to the electrode 52 and any other outer surfaces of capacitor 60 when the capacitor has been heated above 100° C., or is in a desiccated environment, in order to avoid sealing any small amount of existing moisture inside the capacitor 60.

In one embodiment, moisture-resistant coating layer 58 may desirably also be heat-resistant to provide heat-resistant protection to the IPMC capacitor 60 in extreme high temperature operating environments, such as at temperatures above about 200° C. Accordingly, a heat-resistant IPMC capacitor 60 may be provided according to an embodiment of the present invention, which may provide for effective capacitive storage such as in the range of about 0.1-1.0 mF/cm$^2$ and about 40-300 mF/g at high temperatures above 100° C., and desirably also at extreme temperatures in the range of about 200-300° C. In one embodiment, moisture-resistant and desirably also heat-resistant coating layer 58 may comprise any suitable moisture and heat-resistant coating material, such as but not limited to silicon-aluminum thermal coating materials.

A method of fabricating or manufacturing an ionic polymer metal composite capacitor is provided according to an embodiment of the invention. In one embodiment, the method may be easily implemented to produce an IPMC capacitor in the form of a thin strip and/or sheet of substantially any desired size or shape. According to one embodiment, a single layer non-hydrated ionic polymer substrate is provided as the core or backbone of the IPMC capacitor. As described above in reference to FIG. 1, the single layer non-hydrated ionic polymer material may comprise any suitable non-hydrated ionic polymer such as PFSA/PTFE copolymer, polyethylene, and/or polyamine based ionic polymers, for example. In a particular embodiment, a single layer non-hydrated sheet of Nafion™ N-115 ionic polymer may be provided as a suitable substrate. In an optional embodiment, the single layer non-hydrated ionic polymer substrate may be prepared such as by roughening one of more of the surfaces of the substrate prior to application of an electrode. In such an embodiment, the substrate surfaces may be roughened by physical abrasion with an abrasive medium such as emery cloth, for example.

In a second step, conductive film electrodes may be applied to at least a portion of both major surfaces or sides of the single layer non-hydrated ionic polymer substrate. The conductive film electrodes may comprise any suitable electrically conductive material, including metallic materials such as gold, silver, platinum, copper, carbon (such as graphitic, polycrystalline or nanocrystalline carbon), aluminum, etc. and alloys thereof, and/or conductive polymer materials such as indium tin oxide, polypyrrole (PPy), or other conductive polymers, for example. In one embodiment, the conductive film electrodes may each comprise one or more layers of a suitable electrically conductive material applied to the surface of the non-hydrated ionic polymer substrate in a film or layer of approximately 50 nm to 500 nm thickness, for example. In a particular embodiment, the conductive film electrodes may comprise a film of chromium (Cr) of approximately 5 nm thickness applied directly to the non-hydrated ionic polymer substrate, and a film of gold (Au) of approximately 75 nm to 150 nm thickness, applied to the chromium film. In another embodiment, the conductive film electrodes may comprise one or more films or layers of any suitable electrically conductive material of any suitable desired thickness applied to the surface of the non-hydrated ionic polymer substrate.

The conductive film electrodes may be applied to at least a portion of the major surfaces of the non-hydrated ionic polymer substrate by any suitable means or method so as to attach, adhere or otherwise suitably join the conductive film electrodes to the surface of the non-hydrated ionic polymer. In one embodiment, the conductive film electrodes may be formed and applied to the surface of the non-hydrated ionic polymer substrate by sputtering onto the substrate from a source of one or more desired electrically conductive materials, such as in physical sputtering, electronic sputtering, potential sputtering, chemical sputtering, radio frequency (RF) or DC sputtering or other sputtering techniques. In a particular embodiment, the conductive film electrodes may be formed and applied to the surface of the non-hydrated ionic polymer substrate by RF sputtering, such as by using an RF sputtering machine to apply conductive films of chromium and gold to each side of the substrate, as described above. In another embodiment, other forms of physical vapor deposition of conductive materials may be used, such as e-beam deposition and thermal deposition, for example.

In an optional embodiment the method of manufacturing an IPMC capacitor may also comprise a step of attaching electrical connections or leads to each of the conductive film electrodes, such as to provide for connection of the IPMC capacitor to an electrical circuit. In one such embodiment, the electrical connections or leads may comprise electrical wires or other suitable means for providing an electrical connection to the conductive film electrodes. Such electrical connections or leads may be attached to the conductive film electrodes by any suitable means or method of attachment, such as by adhesive, solder, bonding agent, and chemical and/or physical welds, for example. In a particular embodiment where the conductive film electrode comprises a thin sputtered metallic film such as a gold and/or chromium film, the electrical connections may be attached to the electrodes by using an electrically conductive adhesive such as silver epoxy, for example, in order to provide for secure attachment and electrical connection between the electrode and electrical connector. In another embodiment, electrical connections may be patterned on one or more of the conductive film electrode layers allowing for standard connections to be formed for electrical connection of the IPMC capacitor, such as wire bonding or soldering, for example.

In a further embodiment, the method of manufacturing an IPMC capacitor may further comprise a step of heat curing of the IPMC capacitor. In such an embodiment, the heat curing step may comprise heating the IPMC capacitor to a temperature of at least 100° C., and preferably to at least about 120° C. for a period sufficient to volatilize at least a significant portion of any moisture present in the IPMC capacitor, and in particular any moisture that may be absorbed in the non-hydrated ionic polymer substrate. In one such embodiment, the IPMC capacitor may be heated to approximately 120° C. for a period of approximately 10 minutes, which may be sufficient to volatilize a majority of any such moisture.

In another embodiment, the method of manufacturing an IPMC capacitor may also comprise an additional step of coating the IPMC capacitor with at least one protective coating layer following heat curing of the IMPC capacitor as described above. In such an embodiment, at least a portion of the conductive film electrode surfaces of the capacitor, and preferably all outer surfaces of the capacitor including the electrodes and any sides of the non-hydrated ionic polymer substrate may be coated with at least one protective coating layer. In one embodiment, the protective coating layer may comprise a moisture-resistant coating layer suitable to reduce any penetration and/or absorption of moisture by the IPMC capacitor, and in particular, by the non-hydrated ionic polymer substrate of the capacitor.

In a preferred embodiment, the at least one protective coating layer may comprise a moisture-resistant and heat-resistant coating layer applied to substantially all outer surfaces of the IPMC capacitor to provide a desirably moisture and heat-resistant protective coating and seal to reduce or prevent any penetration and/or absorption of moisture by the IPMC capacitor, as may be detrimental to high temperature operation of the IPMC capacitor, as described above. The one or more protective coating layers may comprise any suitable moisture-resistant, and desirably also heat-resistant coating materials, such as silicon-aluminum based aerospace protective coating materials, for example. The one or more coating layers may be applied to the IPMC capacitor using any suitable means or method to produce the desired moisture and/or heat-resistant coating, such as dipping, painting and/or spraying methods of application, for example.

In yet a further optional embodiment, prior to the application of conductive film electrodes to the surfaces of the single layer non-hydrated ionic polymer substrate, the ionic polymer substrate may be ion-exchanged such as to exchange at least a portion of the H+ ions in the ionic polymer material. In one such embodiment, the non-hydrated ionic polymer substrate may be ion exchanged with at least one monovalent cation, such as lithium, rubidium, potassium or sodium, for example, prior to the application of the conductive film electrodes to the non-hydrated ionic polymer substrate. Such pre-fabrication ion exchange may be desirable for manipulating the capacitive charge movement and concentration properties of the non-hydrated ionic polymer substrate, for example.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An ionic polymer metal composite capacitor comprising:
   a thin single layer non-hydrated ionic polymer substrate comprising perfluorosulfonic acid/polytetrafluroethylene material copolymer, said substrate comprising first and second substantially parallel major surfaces;
   first and second conductive film electrodes applied directly to at least a portion of said first and second substantially parallel major surfaces, respectively, of said thin single layer non-hydrated ionic polymer substrate, wherein each of said conductive film electrodes comprises at least one electrically conductive material.

2. The ionic polymer metal composite capacitor according to claim 1, additionally comprising first and second electrical connections conductively attached to said first and second conductive film electrodes, respectively.

3. The ionic polymer metal composite capacitor according to claim 1 wherein said non-hydrated ionic polymer substrate comprises a thin sheet with thickness between about 50 μm and 400 μm.

4. The ionic polymer metal composite capacitor according to claim 1 wherein said non-hydrated ionic polymer substrate comprises a thin sheet with thickness of about 100-200 μm.

5. The ionic polymer metal composite capacitor according to claim 1 wherein said at least one electrically conductive material is selected from the list comprising:
   gold, silver, platinum, copper, carbon, aluminum, conductive polymer materials, indium tin oxide, polypyrrole, and combinations thereof.

6. The ionic polymer metal composite capacitor according to claim 1 wherein each said conductive film electrode comprises at least one electrically conductive film of about 50 nm to 500 nm thickness.

7. The ionic polymer metal composite capacitor according to claim 1, additionally comprising a first dielectric layer situated between said first surface of said ionic polymer substrate and said first conductive film electrode, and a second dielectric layer situated between said second surface of said ionic polymer substrate and said second conductive film electrode.

8. The ionic polymer metal composite capacitor according to claim 7 wherein said first and second dielectric layers comprise air gaps of about 5 nm to 50 nm thickness.

9. The ionic polymer metal composite capacitor according to claim 1 wherein at least a portion of said first or second conductive film electrodes additionally comprises one or more nano-arrays each comprising a pattern of nanofeatures, wherein said nanofeatures are formed in said conductive film electrodes.

10. The ionic polymer metal composite capacitor according to claim 9 wherein said nanofeatures comprise one or more of:
nanoholes of about 5 nm-500 nm in diameter; and
nanoslots of about 50 nm-500 nm in width;
and wherein said nanofeatures extend substantially through the thickness of at least one of said conductive film electrodes.

11. The ionic polymer metal composite capacitor according to claim 2 additionally comprising at least one protective coating layer applied to at least one of said first and second conductive film electrodes.

12. The ionic polymer metal composite capacitor according to claim 11, wherein said at least one protective coating layer comprises a moisture-resistant coating applied to said first and second conductive film electrodes and any exposed edges of said ionic polymer substrate.

13. The ionic polymer metal composite capacitor according to claim 11, wherein said at least one protective coating layer comprises a moisture and heat-resistant silicon/aluminum protective coating material.

14. An ionic polymer metal composite capacitor comprising:
a thin single layer non-hydrated ionic polymer substrate comprising first and second substantially parallel major surfaces;
first and second conductive film electrodes applied directly to at least a portion of said first and second substantially parallel major surfaces, respectively, of said thin single layer non-hydrated ionic polymer substrate, wherein each of said conductive film electrodes comprises:
a first film of chromium applied to at least a portion of said surface of said non-hydrated ionic polymer substrate, and
a second film of gold applied to said first film.

15. The ionic polymer metal composite capacitor according to claim 14, additionally comprising first and second electrical connections conductively attached to said first and second conductive film electrodes, respectively.

16. The ionic polymer metal composite capacitor according to claim 14 wherein said non-hydrated ionic polymer substrate comprises a thin sheet with thickness between about 50 μm and 400 μm.

17. The ionic polymer metal composite capacitor according to claim 14, additionally comprising a first dielectric layer situated between said first surface of said ionic polymer substrate and said first conductive film electrode, and a second dielectric layer situated between said second surface of said ionic polymer substrate and said second conductive film electrode.

18. The ionic polymer metal composite capacitor according to claim 14 wherein at least a portion of said first or second conductive film electrodes additionally comprises one or more nano-arrays each comprising a pattern of nanofeatures, wherein said nanofeatures are formed in said conductive film electrodes.

19. The ionic polymer metal composite capacitor according to claim 18, wherein said nanofeatures comprise one or more of:
nanoholes of about 5 nm-500 nm in diameter; and
nanoslots of about 50 nm-500 nm in width;
and wherein said nanofeatures extend substantially through the thickness of at least one of said conductive film electrodes.

20. The ionic polymer metal composite capacitor according to claim 14, additionally comprising at least one protective coating layer applied to at least one of said first and second conductive film electrodes, wherein said protective coating layer comprises at least one of:
a moisture-resistant coating applied to said first and second conductive film electrodes and any exposed edges of said ionic polymer substrate; and
a moisture and heat-resistant silicon/aluminum protective coating material.

* * * * *